United States Patent
Tan et al.

(10) Patent No.: US 12,289,593 B1
(45) Date of Patent: Apr. 29, 2025

(54) METHOD FOR CONVERTING VEHICLE AUDIO INTO SURROUND SOUND AND VEHICLE SOUND SYSTEM

(71) Applicant: Bo Tan, Berkeley, CA (US)

(72) Inventors: Bo Tan, Berkeley, CA (US); Shaopeng Liu, Suzhou (CN)

(73) Assignee: Bo Tan, Berkeley, CA (US)

( * ) Notice: Subject to any disclaimer, the term of this patent is extended or adjusted under 35 U.S.C. 154(b) by 0 days.

(21) Appl. No.: 18/902,105

(22) Filed: Sep. 30, 2024

(30) Foreign Application Priority Data

Apr. 10, 2024 (CN) .......................... 202410424232.3

(51) Int. Cl.
| | |
|---|---|
| H04S 3/00 | (2006.01) |
| G06F 3/16 | (2006.01) |
| H04S 7/00 | (2006.01) |

(52) U.S. Cl.
CPC ............. H04S 3/008 (2013.01); G06F 3/162 (2013.01); H04S 7/305 (2013.01); H04R 2499/13 (2013.01); H04S 2400/01 (2013.01); H04S 2400/11 (2013.01)

(58) Field of Classification Search
None
See application file for complete search history.

(56) References Cited

U.S. PATENT DOCUMENTS

2023/0018926 A1    1/2023  Callery et al.

FOREIGN PATENT DOCUMENTS

| | | | | | |
|---|---|---|---|---|---|
| CN | 109121069 B | * | 2/2021 | ............. | H04S 7/305 |
| CN | 112866896 A | * | 5/2021 | ............... | G06N 3/08 |
| CN | 113438595 A | * | 9/2021 | | |
| CN | 115858849 A | | 3/2023 | | |
| CN | 116090085 A | | 5/2023 | | |
| CN | 116661727 A | | 8/2023 | | |
| CN | 117295004 A | | 12/2023 | | |
| CN | 117376784 A | | 1/2024 | | |
| WO | WO-2007096792 A1 | * | 8/2007 | ............. | H04S 3/008 |

\* cited by examiner

*Primary Examiner* — Qin Zhu
(74) *Attorney, Agent, or Firm* — Dinsmore & Shohl LLP

(57) ABSTRACT

A method for converting a vehicle audio into a surround sound and a sound system are provided. The method includes: extracting features of an audio data for debugging based on a vehicle audio signal; performing classification according to the extracted features to separate the audio data into a plurality of single audio signals; mixing the plurality of separated single audio signals, and recording parameters of the current sound mixing algorithm as original sound mixing parameters; pre-configuring a plurality of spatial reverberation modes; debugging the original sound mixing parameters; and determining and saving optimized audio channel equalization parameters and optimized sound mixing parameters corresponding to the spatial reverberation modes as the multi-channel surround sound conversion parameters.

6 Claims, 7 Drawing Sheets

METHOD FOR CONVERTING VEHICLE AUDIO INTO SURROUND SOUND AND VEHICLE SOUND SYSTEM

CROSS-REFERENCE TO RELATED APPLICATIONS

This application claims the benefit of China Patent Application No. 202410424232.3 filed Apr. 10, 2024, the entire contents of which are incorporated herein by reference in its entirety.

TECHNICAL FIELD

The present disclosure relates to the field of processing and application of audio signals, and in particular, to a method for converting a vehicle audio into a surround sound, and a sound system.

BACKGROUND

As an important component of a vehicle entertainment device, a vehicle sound system aims to bring a good driving experience to a user by playing an audio in a vehicle cabin, but the existing vehicle sound system has the following problems.

Firstly, it does not have a good immersive experience. Although vehicle surround sound systems can create a broader sound field inside a vehicle, immersion of some vehicle sound systems is still weak possibly due to the quality of loudspeaker, acoustic design inside the vehicle, lack of high quality multi-channel sound source, or the like.

Secondly, it is limited by the upmixing technology. The conventional upmixing technology, such as stereo flipping and subtraction, is still used in some vehicle surround sound systems, and the method may result in a loss of tone quality and a poor effect, and cannot provide a satisfactory listening experience.

Although some advanced vehicle surround sound audio processing algorithms are gradually developed at present to improve the effect of the upmixing technology, the problem that the insufficient multi-channel sound source is required to be made up still exists, such that multi-channel music is required to be made, which requires professional technologies and devices, and specific encoding and decoding standards are required to be met. In order to eliminate limitation of sound coloration and music detail adjustment, the vehicle sound system is also required to provide various sound effects, spatial effects and preset options.

In summary, the existing vehicle surround sound audio technology still has a limited function of adjusting music in detail, and the vehicle surround sound system faces the challenge of the insufficient multi-channel sound source. Moreover, with a development of the technology and an increase of demands, more sound source is expected to be available, and more streaming media platforms and hardware devices are expected to support a multi-channel audio; therefore, there is an urgent need for more advanced processing algorithms and surround sound source to provide a better vehicle surround sound audio experience.

The disclosure of the above background is only used for assisting understanding of the inventive concept and technical solutions of the present disclosure, and it does not necessarily belong to the prior art of the present patent application, nor does it necessarily give technical teaching; the above background should not be used to assess the novelty and inventiveness of the present application in the event that there is no clear evidence that the above disclosure is made prior to the filing date of the present patent application.

SUMMARY

An object of the present disclosure relates to a parameter debugging method for converting a vehicle audio into a surround sound, which are used for simulating a real surround sound space effect and providing a better immersive experience. Another object of the present disclosure relates to a method for converting a vehicle audio into a surround sound.

An aspect provides a parameter debugging method for converting a vehicle audio into a multi-channel surround sound, which is applied to customizing multi-channel surround sound conversion parameters for a vehicle of a target model, the parameter debugging method including the following steps:

acquiring a vehicle audio signal for debugging from the vehicle of the target model, and decoding the vehicle audio signal for debugging to obtain audio data for debugging in a preset standard format;

extracting features of the audio data for debugging, the extracted features including time domain features and frequency domain features;

performing classification according to the extracted features by using an audio separation model, to separate the audio data for debugging into a plurality of single audio signals for debugging, different single audio signals for debugging being located in different audio channels;

determining surround sound channels of the vehicle sound system of the target model; selecting a matched sound mixing algorithm according to the surround sound channels; mixing the plurality of separated single audio signals for debugging by using a sound mixing algorithm, and recording parameters of current sound mixing algorithm as original sound mixing parameters;

pre-configuring a plurality of spatial reverberation modes, and debugging equalization parameters of the audio channels and the original sound mixing parameters for each spatial reverberation mode; and determining and saving the optimized audio channel equalization parameters and optimized sound mixing parameters corresponding to each spatial reverberation modes as the multi-channel surround sound conversion parameters;

wherein, debugging equalization parameters of the audio channels and the original sound mixing parameters for each spatial reverberation mode includes:

presetting various evaluation factors and corresponding weights for audio quality;

operating the vehicle sound system multiple times;

obtaining a score of each evaluation factor for each operation, and calculating a quality score of the operation in conjunction with the corresponding weights; and performing a preset number of operations, and selecting equalization parameters of the audio channels and sound mixing parameters under an operation with a highest quality score as optimized audio channel equalization parameters and optimized sound mixing parameters corresponding to the spatial reverberation mode respectively; or stopping the operation of the vehicle sound system when the quality score reaches a preset optimization score threshold, and taking equalization parameters of the audio channels and sound mixing parameters under a last operation as the optimized audio channel equalization parameters and the optimized sound mixing parameters corresponding to the spatial reverberation mode respectively.

In some embodiments, in accordance with any one or a combination of the foregoing technical solutions, the spatial reverberation modes include a board reverberation mode, a room reverberation mode and a hall reverberation mode;
the evaluation factors and/or weight distributions corresponding to different reverberation modes are not exactly the same.

In some embodiments, in accordance with any one or a combination of the foregoing technical solutions, the audio separation model is an AI model, and the AI mode is trained by:
collecting a plurality of learning samples, each learning sample including audio data, and corresponding time domain features and frequency domain features;
manually marking each learning sample to obtain a label including the plurality of separated single audio signals;
inputting the learning samples and corresponding labels into a basic model, and performing iterative training; and
obtaining the audio separation model when the basic model converges.

In some embodiments, in accordance with any one or a combination of the foregoing technical solutions, the debugging for each spatial reverberation mode further includes:
manually checking the plurality of single audio signals for debugging separated by the audio separation model;
if the check is passed, keeping the current single audio signal for debugging; and
if the check is not passed, adjusting and updating the single audio signal for debugging, acquiring a new learning sample and a corresponding label accordingly, and performing further optimization training on the audio separation model.

In some embodiments, in accordance with any one or a combination of the foregoing technical solutions, before the mixing the plurality of separated single audio signals for debugging, the method further includes:
determining surround sound channels of the vehicle sound system of the target model; and
selecting a matched sound mixing algorithm according to the surround sound channels.

In some embodiments, in accordance with any one or a combination of the foregoing technical solutions, when the surround sound channel include a front left audio channel, a front center audio channel, a front right audio channel, a rear left audio channel, and a rear right audio channel, a 5.1 sound mixing algorithm is selected; or
when the surround sound channels include a front left audio channel, a front center audio channel, a front right audio channel, a left audio channel, a right audio channel, a rear left audio channel, a rear right audio channel, and a low frequency effect audio channel, a 7.1 sound mixing algorithm, or a 7.1.2 sound mixing algorithm, or a 7.1.4 sound mixing algorithm is selected.

In some embodiments, in accordance with any one or a combination of the foregoing technical solutions, the method further includes: adjusting parameters of the sound mixing algorithm by one or more of the following steps:
calibrating an initial frequency response to enable each loudspeaker in the vehicle of the target model to achieve a frequency response curve reaching preset flatness;
correcting a delay time of the loudspeaker, and adjusting the output delay time of each loudspeaker according to a position relationship between each loudspeaker in the vehicle and a target seat in the vehicle;
adjusting a virtual position of each loudspeaker by adjusting volume and the output delay time of each loudspeaker in the vehicle, to enable virtual positions of all loudspeakers to surround the target seat; and
adjusting settings of a compressor and a limiter of the vehicle sound system.

In some embodiments, in accordance with any one or a combination of the foregoing technical solutions, the vehicle audio signal includes an audio signal received through one or more of a vehicle media player, a vehicle Bluetooth interface and a vehicle USB interface.

In some embodiments, in accordance with any one or a combination of the foregoing technical solutions, the standard-format audio data obtained by decoding the vehicle audio signal is an audio data in a PCM format.

In some embodiments, in accordance with any one or a combination of the foregoing technical solutions, the method further includes:
providing a human-computer interaction apparatus electrically connected with the vehicle sound system;
controlling performance parameters of the vehicle sound system by the human-computer interaction apparatus to obtain a personalized sound effect setting; and
saving the personalized sound effect setting, which is allowed to be called subsequently.

Another aspect provides a method for converting a vehicle audio into a multi-channel surround sound, including the following steps:
acquiring the multi-channel surround sound conversion parameters according to the parameter debugging method, the multi-channel surround sound conversion parameters including optimized audio channel equalization parameters and optimized sound mixing parameters corresponding to various spatial reverberation modes of a vehicle of a target model;
acquiring a target vehicle audio signal from the vehicle of the target model, and decoding the target vehicle audio signal to obtain target audio data in a standard format;
extracting features of the target audio data, the extracted features including time domain features and frequency domain features;
performing classification according to the extracted features by using an audio separation model, to separate the target audio data into a plurality of target single audio signals, different target single audio signals being located in different audio channels;
determining corresponding optimized audio channel equalization parameters and optimized sound mixing parameters according to a target spatial reverberation mode selected from the plurality of preconfigured spatial reverberation modes;
processing each target single audio signal located in each audio channel by using the optimized audio channel equalization parameters to obtain each equalized single audio signal;
mixing the equalized single audio signals by using the optimized sound mixing parameters to obtain a result audio signal; and
outputting the mixed result audio signal.

In some embodiments, in accordance with any one or a combination of the foregoing technical solutions, the mixed result audio signal is output by a vehicle loudspeaker, including:

matching corresponding power and driving capability according to the result audio signal; and controlling the driving capability and output power of the vehicle loudspeaker according to the matching result.

In some embodiments, in accordance with any one or a combination of the foregoing technical solutions, after the acquiring a target vehicle audio signal from a vehicle of the target model, the method further includes:

identifying the target vehicle audio signal, and judging whether the target vehicle audio signal belongs to an audio avoiding rendering, the audio avoiding rendering including a navigation audio, a telephone audio and an alarm system audio; and if yes, directly outputting the target vehicle audio signal to the vehicle loudspeaker without performing the method for converting a vehicle audio into a multi-channel surround sound.

In some embodiments, in accordance with any one or a combination of the foregoing technical solutions, the method further includes:

providing a microphone interface configured to connect a microphone apparatus with the vehicle sound system; and receiving an audio signal through one or more of a vehicle media player, a vehicle Bluetooth interface, a vehicle USB interface and the microphone interface as the target vehicle audio signal.

Yet another aspect provides a vehicle sound system, including a loudspeaker and a processor, wherein the processor is configured to execute any one of the above-mentioned method for converting a vehicle audio into a multi-channel surround sound, and output an obtained result audio signal to the loudspeaker.

In some embodiments, in accordance with any one or a combination of the foregoing technical solutions, the vehicle sound system further includes a human-computer interaction apparatus electrically connected with the processor;

the human-computer interaction apparatus is configured to control performance parameters of the vehicle sound system to obtain a personalized sound effect setting;

The method adopts an advanced sound field simulation algorithm, the real surround sound space effect can be more accurately simulated, and the better immersive experience can be provided.

The method use self-developed music analysis and the separation model, combined with a sound source positioning technology and a sound mixing algorithm, fine space effect rendering is performed through a vehicle server device, wherein the surround sound is output to a vehicle system, such that a quality of music is improved, and meanwhile, timbre of the music is not changed, levels and details of the music are clearer, a sound field is wider, and strict requirements of music buffs for the tone quality are met.

The method and system provide more audio parameters and equalizer settings, such that a user can customize the details of the music and adjust the sound effect, so as to realize a more personalized listening experience; the stereo music is automatically rendered into the vehicle immersive surround sound, thereby bringing a listening experience as in a concert hall to drivers and passengers, greatly enriching a selection range of surround sound source and providing more diversified immersive experiences.

BRIEF DESCRIPTION OF THE DRAWINGS

To describe the technical solution of the embodiments of the present application or the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DETAILED DESCRIPTION

In order to make those skilled in the art better understand the technical solutions of the present disclosure, the technical solutions in the embodiments of the present disclosure are clearly and completely described with reference to the accompanying drawings in the embodiments of the present disclosure, and apparently, the described embodiments are not all but only a part of the embodiments of the present disclosure. All other embodiments obtained by a person of ordinary skill in the art based on the embodiments of the present disclosure without creative efforts shall fall within the protection scope of the present disclosure.

It should be noted that the terms "first", "second", or the like, in the description and claims of the present disclosure and in the foregoing drawings are used for distinguishing between similar objects and not necessarily for describing a particular sequential or chronological order. It should be understood that data thus used is interchangeable in proper circumstances, such that the embodiments of the present disclosure described herein can be implemented in orders except the orders illustrated or described herein. Furthermore, the terms "include", "have" and any variation thereof are intended to cover a non-exclusive inclusion; for example, a process, method, apparatus, product, or device including a list of steps or units is not necessarily limited to those steps or units expressly listed, but may include other steps or units not expressly listed or inherent to the process, method, product, or device.

Figure 1:
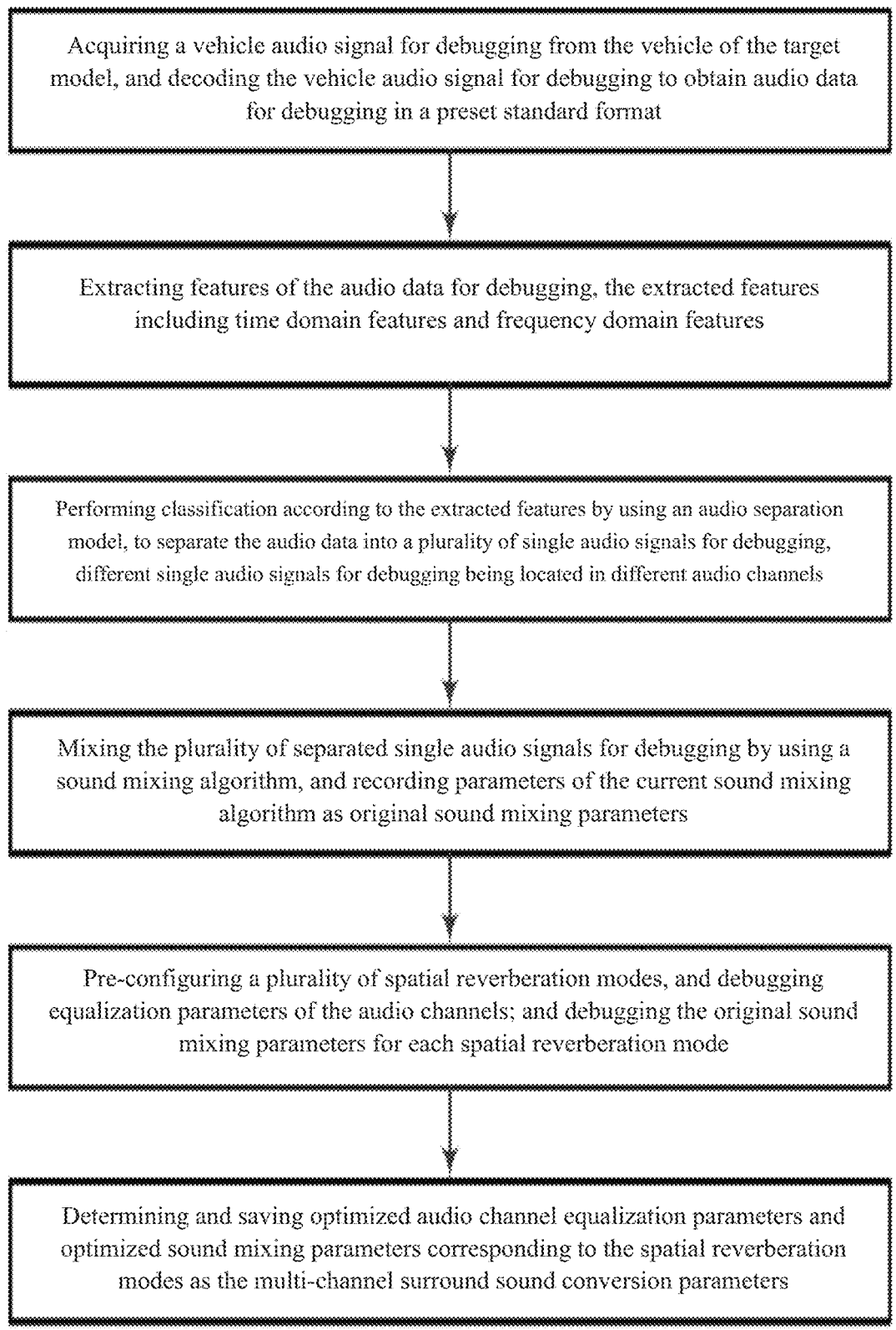
FIG. 1 is a schematic diagram of a parameter debugging method for converting a vehicle audio into a surround sound according to an exemplary embodiment of the present disclosure.

In an embodiment of the present disclosure, referring to FIG. 1, a parameter debugging method for converting a vehicle audio into a multi-channel surround sound is provided, which is applied to customizing multi-channel surround sound conversion parameters for a vehicle of a target model. The parameter debugging method includes the following six steps.

First step: acquiring a vehicle audio signal for debugging from the vehicle of the target model, and decoding the vehicle audio signal for debugging to obtain audio data for debugging in a preset standard format.

Specifically, an audio signal is received through one or more of a vehicle media player, a vehicle Bluetooth interface and a vehicle USB interface as the vehicle audio signal. The standard-format audio data obtained by decoding the vehicle audio signal is an audio data in a PCM format.

Second step: extracting features of the audio data for debugging, the extracted features including time domain features and frequency domain features; specifically, the time domain features including amplitude, timbre, or the like; the frequency domain features including frequency spectrum, frequency, or the like.

Third step: performing classification according to the extracted features by using an audio separation model, so as to separate the audio data for debugging into a plurality of single audio signals for debugging, different single audio signals for debugging being located in different audio channels.

Specifically, the audio separation model is an AI model in which structures of a convolutional neural network and a long-short term memory neural network are used to construct an encoder-decoder model configured to learn a music time structure and parse separated waveforms corresponding to a plurality of single sound sources in a target audio signal.

The specific method for constructing the encoder-decoder model is disclosed in Chinese Patent Application No. CN117295004A, which discloses: constructing an initial model based on the convolutional neural network and the long-short term memory neural network, a plurality of CNN layers and a plurality of LSTM layers being configured in the initial model; extracting features of all sections in an input signal by utilizing the CNN layers to generate CNN features of all the sections; performing space modeling on all the sections of the input signal based on the CNN features; processing the CNN features by utilizing the LSTM layers to generate LSTM features of all the sections; and performing time modeling on the CNN features and all the sections based on the LSTM features.

A training mode of the AI model with the structures of the convolutional neural network and the long-short term memory neural network is also disclosed in Chinese Patent Application No. CN117295004A, wherein, separated waveforms of a human voice and/or various musical instruments and a full waveform of a mixed audio are collected, and the separated waveforms and the full waveform are manually marked with classification labels respectively as a learning sample set for model training and verification; for example, for various songs, waveforms of the human voice, background music and various musical instruments are manually separated by an audio engineer, and the waveforms are marked; for example, one waveform is marked as piano, and the other waveform is marked as human voice, etc.

A plurality of learning samples are collected, each learning sample including audio data, and corresponding time domain features and frequency domain features; each learning sample is manually marked to obtain a label separated into a plurality of pieces of single audio information; the learning samples and the corresponding labels are input into a basic model, and iterative training is performed; and the audio separation model is obtained when the basic model converges.

The learning sample set is input into the initial model after space modeling and time modeling, and the initial model learns to extract time-frequency features of the human voice, background music and/or musical instruments. That is, the model learns to identify various waveforms from the full waveform, and multi-target learning of the initial model is realized in a time-frequency mask mode to obtain the encoder-decoder model capable of predicting the separated waveforms.

The encoder-decoder model outputs the corresponding classification label of the separated waveform while outputting a prediction result of the separated waveform; therefore, a sound source attribute matched with the separated waveform can be identified according to the corresponding classification label, a corresponding audio element is further separated, and the audio element is associated with the classification label, so as to realize feature marking of the separated audio element according to the preset classification label.

Fourth step: mixing the plurality of separated single audio signals for debugging by using a sound mixing algorithm, and recording parameters of the current sound mixing algorithm as original sound mixing parameters.

Specifically, surround sound channels of the vehicle sound system of the target model are determined, and then, a matched sound mixing algorithm is selected according to the surround sound channels. Exemplarily, when the surround sound channels are composed of a front left audio channel, a front center audio channel, a front right audio channel, a rear left audio channel, and a rear right audio channel, a 5.1 sound mixing algorithm is selected. Or when the surround sound channels are composed of a front left audio channel, a front center audio channel, a front right audio channel, a left audio channel, a right audio channel, a rear left audio channel, a rear right audio channel, and a low frequency effect audio channel, a 7.1 sound mixing algorithm, or a 7.1.2 sound mixing algorithm, or a 7.1.4 sound mixing algorithm is selected. The algorithms can mix separated audio signals to achieve a surround sound effect suitable for an acoustic environment inside the vehicle.

In addition to determining/selecting the sound mixing algorithm, parameters thereof may be adjusted by one or more of the following steps:

calibrating an initial frequency response to enable each loudspeaker in the vehicle of the target model to achieve a frequency response curve reaching preset flatness; and/or correcting a delay time of the loudspeaker, and adjusting the output delay time of each loudspeaker according to a position relationship between each loudspeaker in the vehicle and a target seat in the vehicle; and/or adjusting virtual positions by adjusting volumes and the output delay times of the loudspeakers in the vehicle to enable the virtual positions of the loudspeakers to surround the target seat; and/or adjusting settings of a compressor and a limiter of the vehicle sound system, so as to optimize the surround sound effect and quality.

Fifth step: pre-configuring a plurality of spatial reverberation modes, and performing the following debugging for each spatial reverberation mode: debugging equalization parameters of the audio channels; and debugging the original sound mixing parameters.

Specifically, the spatial reverberation mode includes a board reverberation mode, a room reverberation mode and a hall reverberation mode. The evaluation factors and/or weight distribution corresponding to different reverberation modes are not exactly the same, and a user can select effects of different simulation spaces according to preference.

Specifically, the debugging is performed for the spatial reverberation mode by:
  presetting various evaluation factors and corresponding weights for audio quality; exemplarily, the evaluation factors including volume, dynamic performance, distortion, spatiality, or the like;
  operating the vehicle sound system multiple times;
  obtaining a score of each evaluation factor for each operation, and calculating a quality score of the operation in conjunction with the corresponding weights; and
  performing a preset number of operations, and selecting equalization parameters of the audio channels and sound mixing parameters under an operation corresponding to a highest quality score as the optimized audio channel equalization parameters and the optimized sound mixing parameters respectively.

In an alternative embodiment, the specific number of the operations may not be set, and the vehicle sound system is operated until the quality score reaches a preset optimization score threshold, and the equalization parameters of the audio channel and the sound mixing parameters under the last operation are taken as the optimized audio channel equalization parameters and the optimized sound mixing parameters respectively.

In an embodiment of the present disclosure, the debugging for each spatial reverberation mode further includes: manually checking the plurality of single audio signals for debugging separated by the audio separation model; if the check is passed, keeping the current single audio signal for debugging; and if the check is not passed, adjusting and updating the single audio signal for debugging, acquiring a new learning sample and a corresponding label accordingly, and performing further optimization training in the audio separation model.

Sixth step: determining and saving the optimized audio channel equalization parameters and optimized sound mixing parameters corresponding to the spatial reverberation modes as the multi-channel surround sound conversion parameters.

Based on the above six steps, the multi-channel surround sound conversion parameters can be obtained. Obviously, the conversion parameters are allowed to be further manually adjusted to meet personalization requirements, and in such an embodiment, a human-computer interaction apparatus may be provided and electrically connected with the vehicle sound system. The performance parameters of the vehicle sound system are controlled by the human-computer interaction apparatus to obtain a personalized sound effect setting, and the personalized sound effect setting is saved, the saved personalized sound effect setting is allowed to be called subsequently. In this way, on the basis of the multi-channel surround sound conversion parameters obtained by the above-described embodiment, the user is allowed to perform manual fine adjustment to obtain a personalized surround sound preferred by the user, and to save the personalized setting for subsequent reuse.

Figure 2:
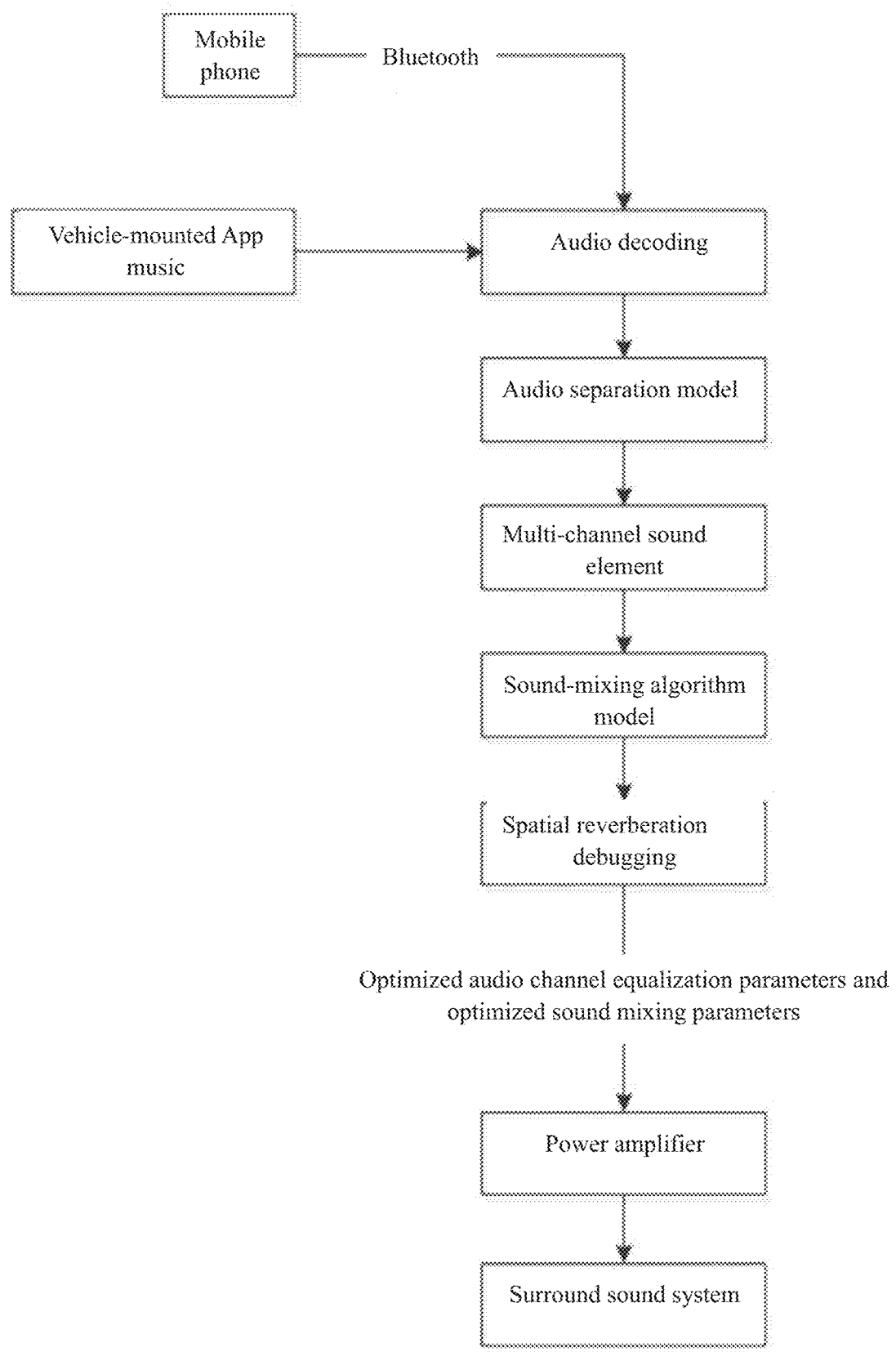
FIG. 2 is a diagram showing conversion of a vehicle audio into a multi-channel surround sound in an exemplary embodiment of the present disclosure.
Figure 3:
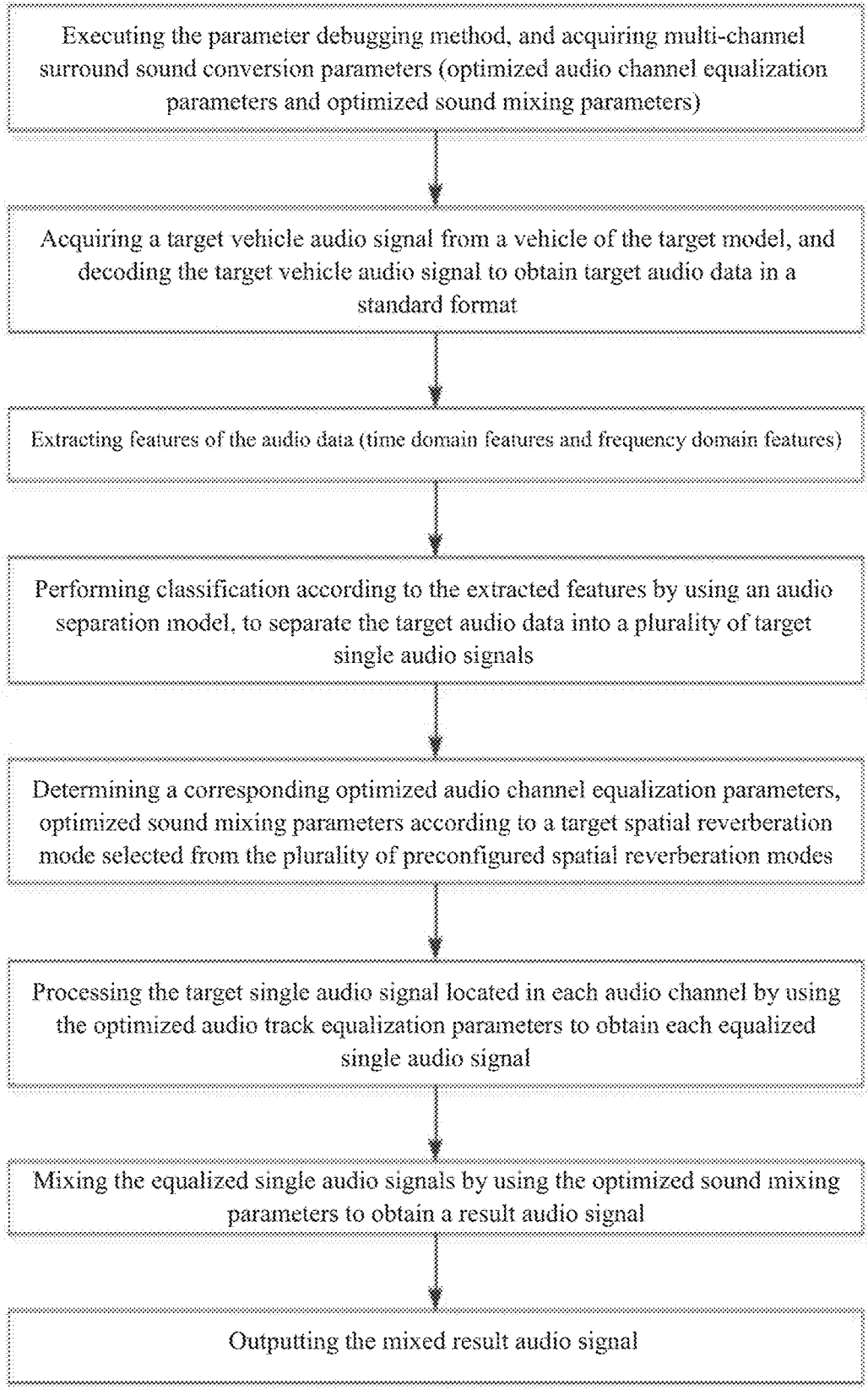
FIG. 3 is a flowchart of a method for converting a vehicle audio into a multi-channel surround sound according to an exemplary embodiment of the present disclosure.

In an embodiment of the present disclosure, a method for converting a vehicle audio into a multi-channel surround sound is provided, referring to FIG. 3, including the following steps:
  based on the parameter debugging method as mentioned in the above embodiment, acquiring the multi-channel surround sound conversion parameters including optimized audio channel equalization parameters and optimized sound mixing parameters corresponding to various spatial reverberation modes of a vehicle of a target model, which is a premise of conversion of the multi-channel surround sound;
  acquiring a target vehicle audio signal from the vehicle of the target model, and decoding the target vehicle audio signal to obtain target audio data in a standard format; wherein as shown in FIG. 2, the target vehicle audio signal can be acquired through vehicle-mounted App or through Bluetooth connection with a mobile phone;
  extracting features of the target audio data, the extracted features including time domain features and frequency domain features;
  performing classification according to the extracted features by using an audio separation model, so as to separate the target audio data into a plurality of target single audio signals, different target single audio signals being located in different audio channels; wherein as shown in FIG. 2, the audio separation model separates the audio into multi-channel audio elements;
  determining corresponding optimized audio channel equalization parameters and optimized sound mixing parameters according to a target spatial reverberation mode selected from the plurality of preconfigured spatial reverberation modes, as shown in FIG. 2;
  processing the target single audio signal located in each audio channel by using the optimized audio channel equalization parameters to obtain each equalized single audio signal;
  mixing the equalized single audio signals by using the optimized sound mixing parameters to obtain a result audio signal; and
  outputting the mixed result audio signal, wherein specifically, as shown in FIG. 2, the mixed result audio signal is output by a vehicle loudspeaker, that includes: matching corresponding power and driving capability according to the result audio signal; and controlling the loudspeaker driving capability and loudspeaker output power according to the matching result. The required power and driving capability can be provided for the loudspeaker by selecting a proper power amplifier and amplifier.

In an embodiment of the present disclosure, after the acquiring a target vehicle audio signal from the vehicle of the target model, the method further includes: identifying the target vehicle audio signal, and judging whether the target vehicle audio signal is an audio avoiding rendering, the audio avoiding rendering including a navigation audio, a telephone audio and an alarm system audio; and if yes, directly outputting the target vehicle audio signal to the vehicle loudspeaker without performing the method for converting a vehicle audio into a multi-channel surround sound.

In an embodiment of the present disclosure, the method for converting a vehicle audio into a multi-channel surround sound further includes: providing a microphone interface configured to connect a microphone apparatus with the vehicle sound system; and receiving an audio signal through one or more of a vehicle media player, a vehicle Bluetooth interface, a vehicle USB interface and the microphone interface as the target vehicle audio signal, so as to provide the user with the service of Karaoke in the vehicle and optimization of output sound quality of the Karaoke.

Figure 5:
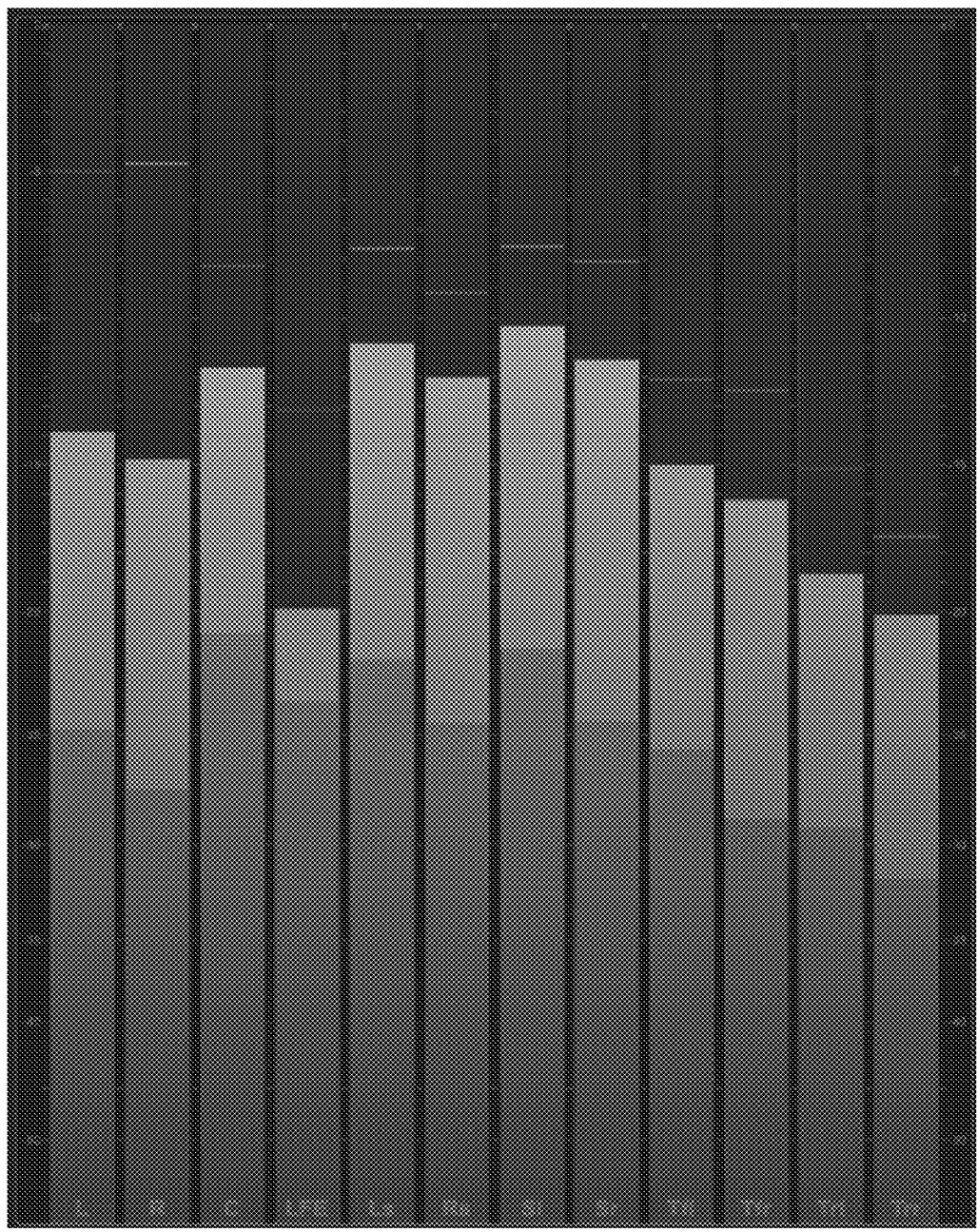
FIG. 5 is an audio histogram of a converted multi-channel surround sound in an exemplary embodiment of the present disclosure.
Figure 7:
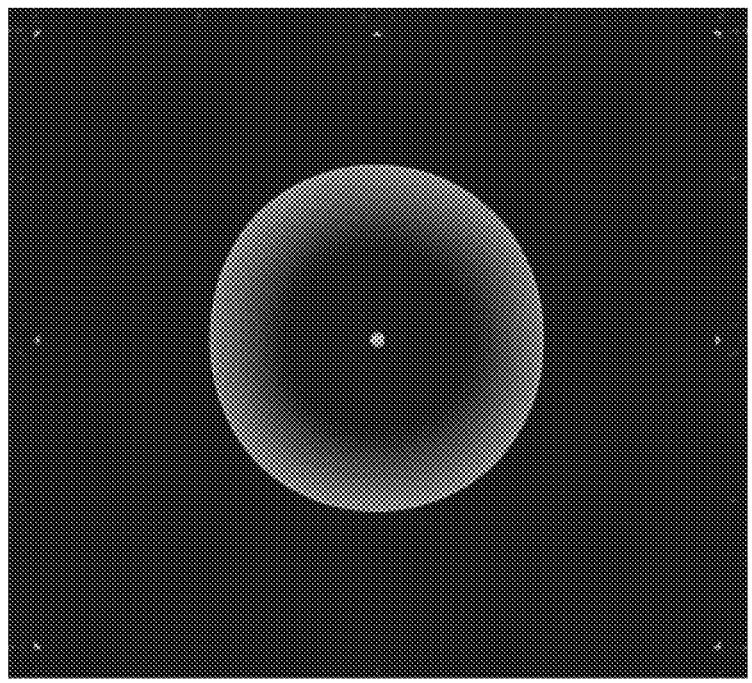
FIG. 7 is a width measurement diagram of a converted multi-channel surround sound in an exemplary embodiment of the present disclosure.
Figures 8, 9:
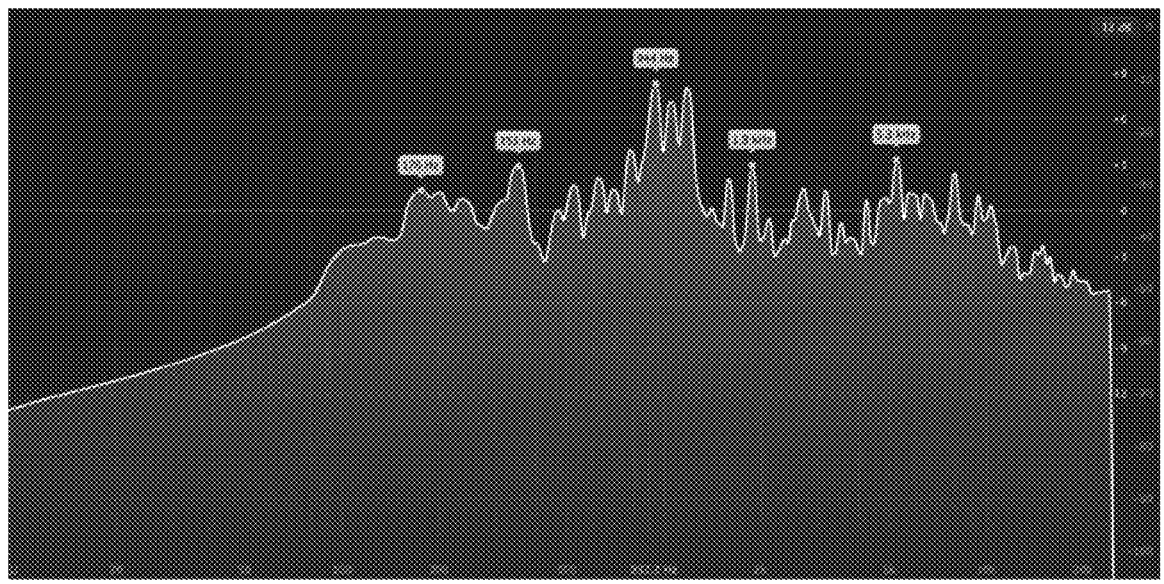
FIG. 8 is an equalization graph of the stereo sound before improving.
FIG. 9 is an equalization graph of a converted multi-channel surround sound in an exemplary embodiment of the present disclosure.

Characteristics (audio frequency, width and equalization) of the surround sound obtained by implementing the method for converting a vehicle audio into a multi-channel surround sound according to the embodiment of the present disclosure are shown in FIG. 5, FIG. 7 and FIG. 9 respectively.

Figure 4:
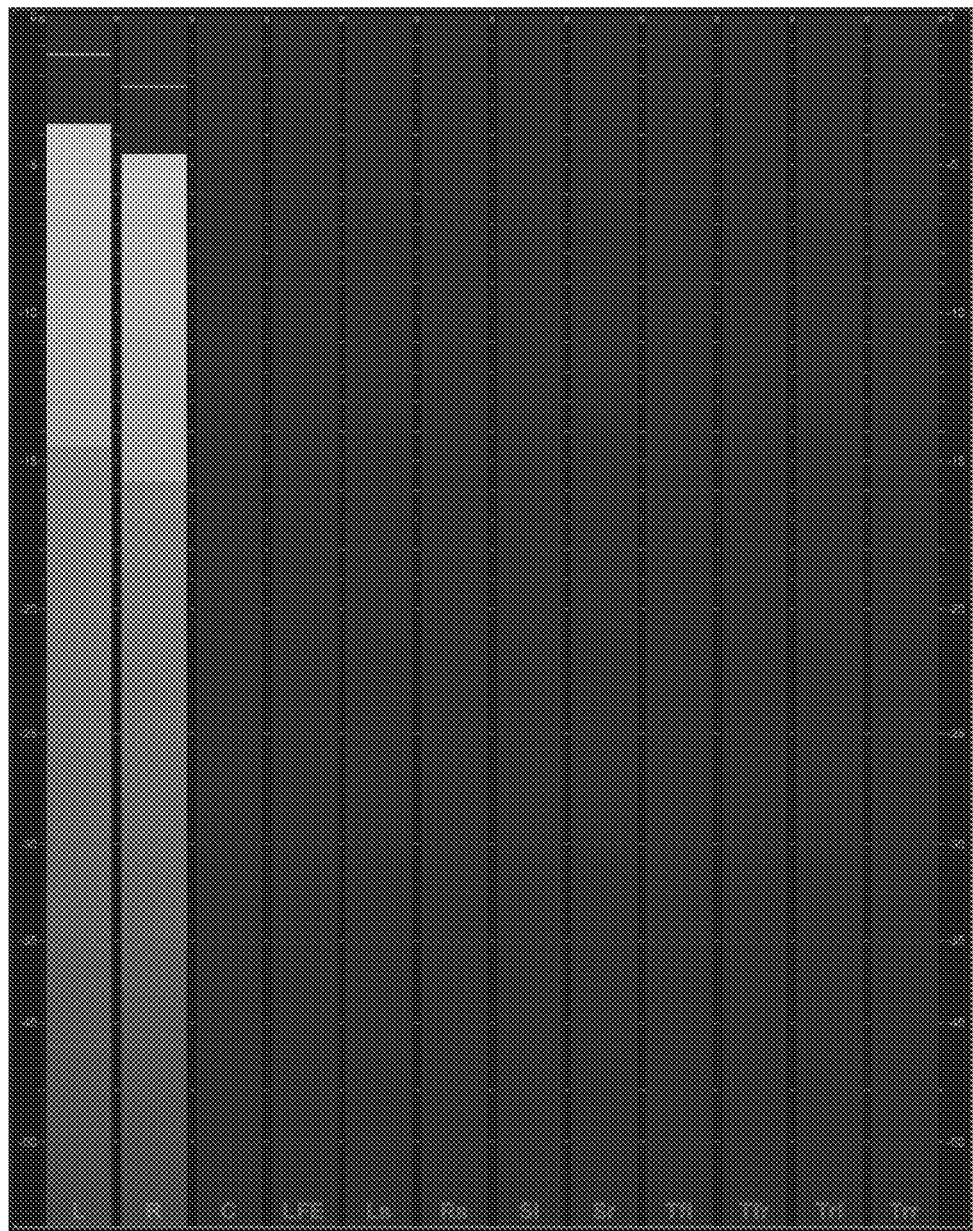
FIG. 4 is a histogram of a stereo audio before improving.

The audio histogram of the converted multi-channel surround sound shown in FIG. 5 is compared with the audio histogram of the sound signal before conversion shown in FIG. 4, the audio histogram is mainly used for embodying the number of channels and energy comparison of the audio signal, and since all sound elements can only be placed on left and right channels (see FIG. 4), a traditional stereo sound has a large volume and is crowded; all sound elements of the 7.1.4 surround sound rendered by the conversion method according to the embodiment of the present disclosure can be dispersed in 12 channels (see FIG. 5), and the sound is not crowded and is clearer.

Figure 6:
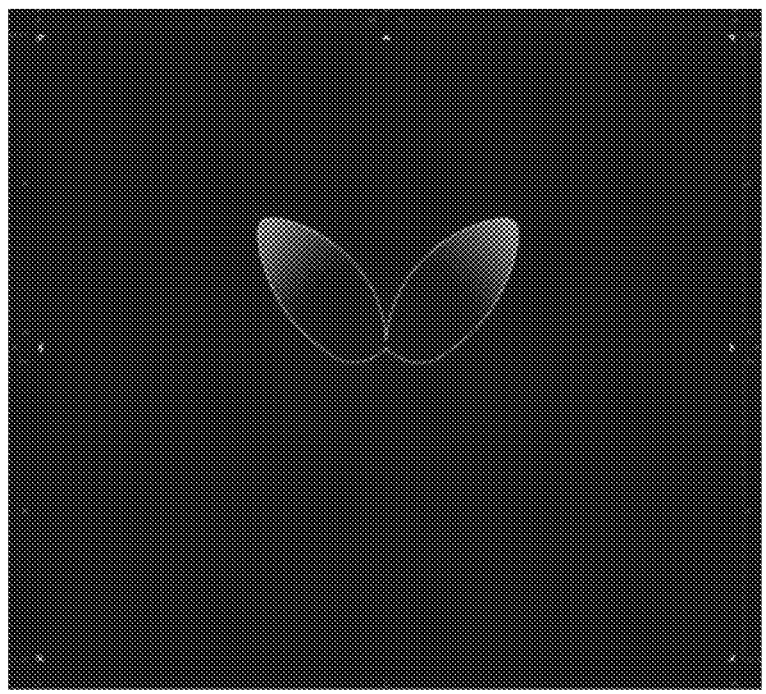
FIG. 6 is a width measurement diagram of a stereo sound before improving.

By comparing the width measurement diagram of the converted multi-channel surround sound shown in FIG. 7 with the width measurement diagram of the sound signal before conversion shown in FIG. 6, it can be seen intuitively that the original stereo sound (see FIG. 6) has only left and right channels, such that the sound spreads in a butterfly shape, and the 7.1.4 surround sound rendered by the conversion method according to the embodiment of the present disclosure takes the user as a center (see FIG. 7) and circularly surrounds the user by 360 degrees, so as to give a strong immersion listening feeling.

By comparing the equalization graph of the converted multi-channel surround sound shown in FIG. 9 with the equalization graph of the sound signal before conversion shown in FIG. 8, it can be seen that the equalization curve of the 7.1.4 surround sound rendered by the conversion method according to the embodiment of the present disclosure in FIG. 9 is highly consistent with that of the original music, and has no sound coloration; that is, the most original timbre of the music can be restored while the music immersion feeling is improved.

In an embodiment of the present disclosure, a vehicle sound system is provided, including a loudspeaker and a processor, wherein the processor is configured to execute any one of the above-mentioned method for converting a vehicle audio into a multi-channel surround sound, and output an obtained result audio signal to the loudspeaker.

In an embodiment of the present disclosure, the sound system further includes a human-computer interaction apparatus electrically connected with the processor; the human-computer interaction apparatus is configured to control performance parameters of the vehicle sound system to obtain a personalized sound effect setting; the processor is configured to save and call the personalized sound effect setting. The human-computer interaction apparatus enables the user to easily control various parameters of the sound system, such as an element volume, a sound channel volume, a sound field setting, or the like; a user preference setting function is provided, and the user is allowed to save and call personalized sound effect settings, so as to meet requirements of different users.

Exemplarily, the human-computer interaction apparatus is integrated with a multimedia system of the vehicle, so as to ensure interconnectivity of the sound system and other functions of the vehicle.

It should be noted that herein, relational terms, such as first, second, or the like, may be used solely to distinguish one entity or operation from another entity or operation without necessarily requiring or implying any actual such relationship or order between such entities or operations. Moreover, the term "comprising", "including", or any other variant thereof is intended to encompass a non-exclusive inclusion, so that the process, method, article or device including a series of elements does not only include those elements, but also includes other elements not explicitly listed, or further includes inherent elements of the process, method, article or device. In cases where no further limitations are made, the element defined with the statement "including one . . . " does not exclude the case that other identical elements further exist in the process, method, article or device including the elements.

What is claimed is:

1. A method for converting a vehicle audio into a multi-channel surround sound, comprising:
   acquiring multi-channel surround sound conversion parameters according to a parameter debugging step, the multi-channel surround sound conversion parameters comprising optimized audio channel equalization parameters and optimized sound mixing parameters corresponding to various spatial reverberation modes of a vehicle of a target model;
   acquiring a target vehicle audio signal from a vehicle of a target model, and decoding the target vehicle audio signal to obtain target audio data in a standard format;
   extracting features of the target audio data, the extracted features comprising time domain features and frequency domain features;
   performing classification according to the extracted features by using an audio separation model, to separate the target audio data into a plurality of target single audio signals, different target single audio signals being located in different audio channels;
   determining corresponding optimized audio channel equalization parameters and optimized sound mixing parameters according to a target spatial reverberation mode selected from the plurality of preconfigured spatial reverberation modes;
   processing each target single audio signal located in each audio channel by using the optimized audio channel equalization parameters to obtain each equalized single audio signal;
   mixing equalized single audio signals by using the optimized sound mixing parameters to obtain a result audio signal; and
   outputting the mixed result audio signal;
   wherein, the parameter debugging step comprises:
   acquiring a vehicle audio signal for debugging from the vehicle of the target model, and decoding the vehicle audio signal for debugging to obtain audio data for debugging in a preset standard format;
   extracting features of the audio data for debugging, the extracted features comprising time domain features and frequency domain features;
   performing classification according to the extracted features by using an audio separation model, to separate the audio data for debugging into a plurality of single audio signals for debugging, different single audio signals for debugging being located in different audio channels;
   determining surround sound channels of the vehicle sound system of the target model; selecting a matched sound mixing algorithm according to the surround sound channels; mixing the plurality of separated single audio signals for debugging by using a sound mixing algorithm, and recording parameters of current sound mixing algorithm as original sound mixing parameters;

pre-configuring a plurality of spatial reverberation modes, and debugging equalization parameters of the audio channels and the original sound mixing parameters for each spatial reverberation mode, comprising:

presetting various evaluation factors and corresponding weights for audio quality;

operating the vehicle sound system multiple times;

obtaining a score of each evaluation factor for each operation, and calculating a quality score of the operation in conjunction with the corresponding weights; and performing a preset number of operations, and selecting equalization parameters of the audio channels and sound mixing parameters under an operation with a highest quality score as optimized audio channel equalization parameters and optimized sound mixing parameters corresponding to the spatial reverberation mode respectively; or stopping the operation of the vehicle sound system when the quality score reaches a preset optimization score threshold, and taking equalization parameters of the audio channels and sound mixing parameters under a last operation as the optimized audio channel equalization parameters and the optimized sound mixing parameters corresponding to the spatial reverberation mode respectively; and determining and saving the optimized audio channel equalization parameters and optimized sound mixing parameters corresponding to each spatial reverberation modes as the multi-channel surround sound conversion parameters.

2. The method for converting a vehicle audio into a multi-channel surround sound of claim 1, wherein the mixed result audio signal is output by a vehicle loudspeaker, comprising:

matching corresponding power and driving capability according to the result audio signal; and controlling the driving capability and the output power of the vehicle loudspeaker according to matching result.

3. The method for converting a vehicle audio into a multi-channel surround sound of claim 1, after the acquiring a target vehicle audio signal from a vehicle of the target model, further comprising:

identifying the target vehicle audio signal, and judging whether the target vehicle audio signal belongs to an audio avoiding rendering, the audio avoiding rendering comprising a navigation audio, a telephone audio and an alarm system audio; and if yes, directly outputting the target vehicle audio signal to the vehicle loudspeaker without performing the method for converting a vehicle audio into a multi-channel surround sound.

4. The method for converting a vehicle audio into a multi-channel surround sound of claim 1, further comprising:

providing a microphone interface configured to connect a microphone apparatus with the vehicle sound system; and receiving an audio signal through one or more of a vehicle media player, a vehicle Bluetooth interface, a vehicle USB interface and the microphone interface as the target vehicle audio signal.

5. A vehicle sound system, comprising a loudspeaker and a processor, wherein the processor is configured to execute the method for converting a vehicle audio into a multi-channel surround sound claim 1, and output an obtained result audio signal to the loudspeaker.

6. The vehicle sound system of claim 5, further comprising a human-computer interaction apparatus electrically connected with the processor;

wherein the human-computer interaction apparatus is configured to control performance parameters of the vehicle sound system to obtain a personalized sound effect setting;

the processor is configured to save and call the personalized sound effect setting.

* * * * *